(12) United States Patent
Strand

(10) Patent No.: US 11,644,594 B2
(45) Date of Patent: May 9, 2023

(54) SURVEYING WITH LOW FREQUENCY IMPULSE SOURCES

(71) Applicant: PGS Geophysical AS, Oslo (NO)

(72) Inventor: Christian Strand, Carrigshaun (GB)

(73) Assignee: PGS GEOPHYSICAL AS, Oslo (NO)

( * ) Notice: Subject to any disclaimer, the term of this patent is extended or adjusted under 35 U.S.C. 154(b) by 270 days.

(21) Appl. No.: 16/940,829

(22) Filed: Jul. 28, 2020

(65) Prior Publication Data
US 2021/0048545 A1 Feb. 18, 2021

Related U.S. Application Data

(60) Provisional application No. 62/887,966, filed on Aug. 16, 2019.

(51) Int. Cl.
*G01V 1/38* (2006.01)
*G01V 1/137* (2006.01)
*G01V 1/00* (2006.01)

(52) U.S. Cl.
CPC ............ *G01V 1/3861* (2013.01); *G01V 1/006* (2013.01); *G01V 1/137* (2013.01); *G01V 1/38* (2013.01);
(Continued)

(58) Field of Classification Search
CPC ...... G01V 1/3861; G01V 1/006; G01V 1/137; G01V 1/38; G01V 1/3808; G01V 2210/127; G01V 2210/1293; G01V 1/02
See application file for complete search history.

(56) References Cited

U.S. PATENT DOCUMENTS

| 3,249,177 A | 5/1966 | Chelminski |
| 4,271,924 A | 6/1981 | Chelminski |

(Continued)

FOREIGN PATENT DOCUMENTS

| WO | 2005111657 A1 | 11/2005 |
| WO | 2009092069 A1 | 7/2009 |

(Continued)

OTHER PUBLICATIONS

United Kingdom Search Report dated Jan. 21, 2021, for Application No. GB2012755.1.
(Continued)

*Primary Examiner* — Ian J Lobo
(74) *Attorney, Agent, or Firm* — Patterson + Sheridan, LLP

(57) ABSTRACT

A method and apparatus for marine surveying. A system includes: a standard-volume source element; a large-volume source element comprising an airgun having a volume greater than 1200 cubic inches; and a long-offset survey streamer. A method includes: towing a standard-volume source element; and towing a large-volume source element; activating the large-volume source element at large shotpoint intervals; and activating the standard-volume source element at standard shotpoint intervals, wherein the large shotpoint intervals are at least twice as long as the standard shotpoint intervals. A method includes: obtaining geophysical data for a subterranean formation; and processing the geophysical data to produce an image of the subterranean formation. A method includes: obtaining a firing plan for a plurality of seismic sources, wherein: a first seismic source of the plurality comprises a large-volume source element, and a second seismic source of the plurality consists of standard-volume source elements.

20 Claims, 10 Drawing Sheets

(52) U.S. Cl.
CPC ...... *G01V 1/3808* (2013.01); *G01V 2210/127* (2013.01); *G01V 2210/1293* (2013.01)

(56) References Cited

U.S. PATENT DOCUMENTS

| | | | |
|---|---|---|---|
| 5,430,689 | A | 7/1995 | Rigsby et al. |
| 7,400,552 | B2 | 7/2008 | Moldoveanu et al. |
| 8,488,409 | B2 | 7/2013 | Hill et al. |
| 8,559,264 | B2 | 10/2013 | Moldoveanu |
| 8,818,730 | B2 | 8/2014 | Eick et al. |
| 8,837,255 | B2 | 9/2014 | Ross et al. |
| 8,971,152 | B2 | 3/2015 | Chelminski |
| 9,010,484 | B2 | 4/2015 | Coste et al. |
| 9,482,766 | B2* | 11/2016 | Parkes ................. G01V 1/3861 |
| 9,746,570 | B2 | 8/2017 | Mensch |
| 9,835,745 | B2 | 12/2017 | Desrues |
| 10,139,511 | B2 | 11/2018 | Mensch |
| 10,379,256 | B2 | 8/2019 | Adams et al. |
| 2008/0011540 | A1 | 1/2008 | Moldoveanu et al. |
| 2011/0199857 | A1 | 8/2011 | Garden et al. |
| 2015/0234071 | A1 | 8/2015 | Hegna |
| 2015/0260867 | A1* | 9/2015 | Abma ................. G01V 1/3808 367/7 |
| 2018/0164457 | A1 | 6/2018 | Beitz et al. |
| 2018/0372900 | A1 | 12/2018 | Lelaurin et al. |
| 2019/0120988 | A1 | 4/2019 | O'Dowd |

FOREIGN PATENT DOCUMENTS

| | | |
|---|---|---|
| WO | 2012027117 A2 | 3/2012 |
| WO | 2018108979 A1 | 6/2018 |
| WO | 2019246297 A1 | 12/2019 |

OTHER PUBLICATIONS

Brice, Tim, et al.—"Wide-tow source configurations for towed multimeasurement streamer acquisition," 2015 SEG New Orleans Annual Meeting, pp. 86-88.

Chelminski, Steve, et al.—"Low-frequency pneumatic seismic sources," Geophysical Prospecting, revision accepted Feb. 2019, European Association of Geoscientists & Engineers, pp. 1-10.

Dhelie, P.E., et al.—"Towards a seismic point source—Smaller, quieter and cheaper," 2017 SEG International Exposition and 87th Annual Meeting, pp. 85-89.

GWL—"GWL LF Source" brochure, date unknown, 1 page.

Hegna, Stian, et al.—"The low frequency output of marine air-gun arrays," 2011 SEG San Antonio Annual Meeting, pp. 77-81.

Johnston, R.C., et al.—"Special Report of the SEG Technical Standards Committee, SEG standards for specifying marine seismic energy sources," document converted from the original publication, 1988 [Special report on marine seismic energy source standards, Geophysics, 53. No. 04, 566-575 (Errata in GEO-53-7-1011)], pp. 1-14.

Long, Andrew—"Increasing Towed Streamer Survey Efficiency," A Clearer Image, a PGS publication, Aug. 2018, pp. 1-15.

Long, Andrew—"Source and streamer towing strategies for improved efficiency, spatial sampling and near offset coverage," First Break, vol. 35, Nov. 2017, pp. 71-74.

PGS—"Dual versus Triple Source," PGS Webpage https://www.pgs.com/marine-acquisition/tools-and-techniques/marine-seismic-sources/technology/dual-versus-triple-source/, Feb. 20, 2020, 5 pages.

PGS—"PGS and TGS Joint Venture MultiClient Project in the Barents Sea," PGS Webpage https://www.pgs.com/media-and-events/news/pgs-and-tgs-joint-venture-multiclient-project-in-the-barents-sea/, May 29, 2018, 3 pages.

PGS—"Ramform + Triple Source = Ultra HD3D," PGS Webpage https://www.pgs.com/publications/feature-stories/ramform-plus-triple-source-equals-ultra-hd3d/, Jun. 1, 2018, 5 pages.

Ronen, Shuki, et al.—Tuned Pulse Source—a new low frequency seismic source, 2017 SEG International Exposition and 87th Annual Meeting, pp. 6085-6088.

Teledyne Bolt—"Long Life Seismic Source" brochure, 2015, 2 pages.

Teledyne Marine—Teledyne Bolt Model 1500LL Source, technical specifications, date unknown, 1 page.

United Kingdom Examination Report dated Nov. 1, 2022, for UK Patent Application No. GB2012755.1.

* cited by examiner

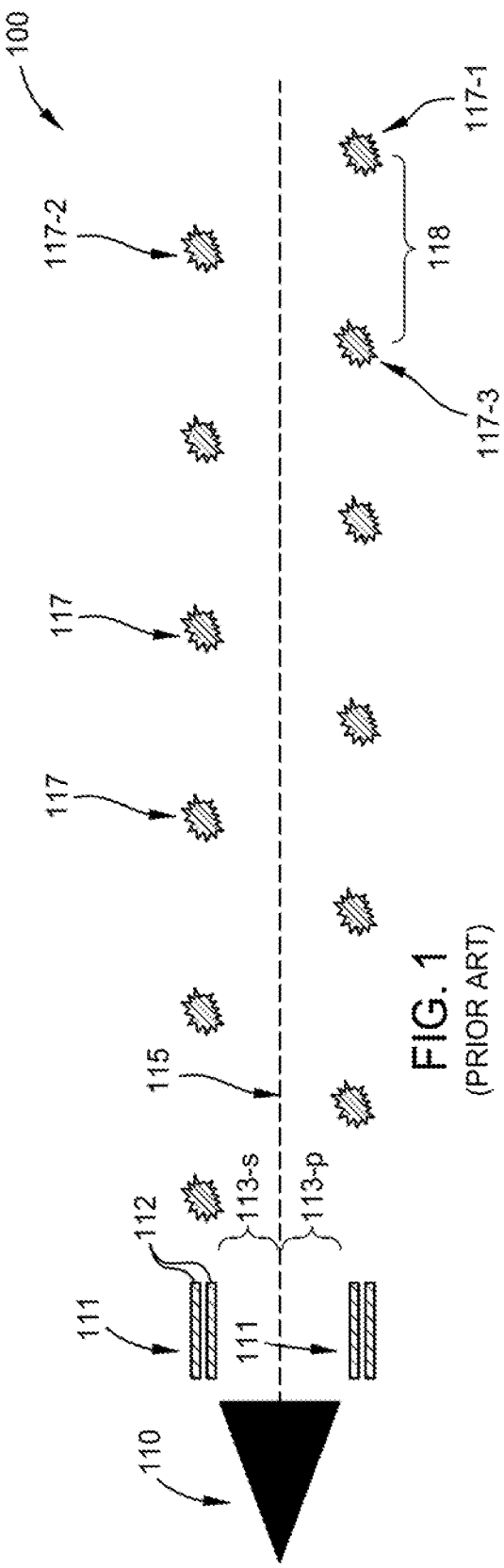
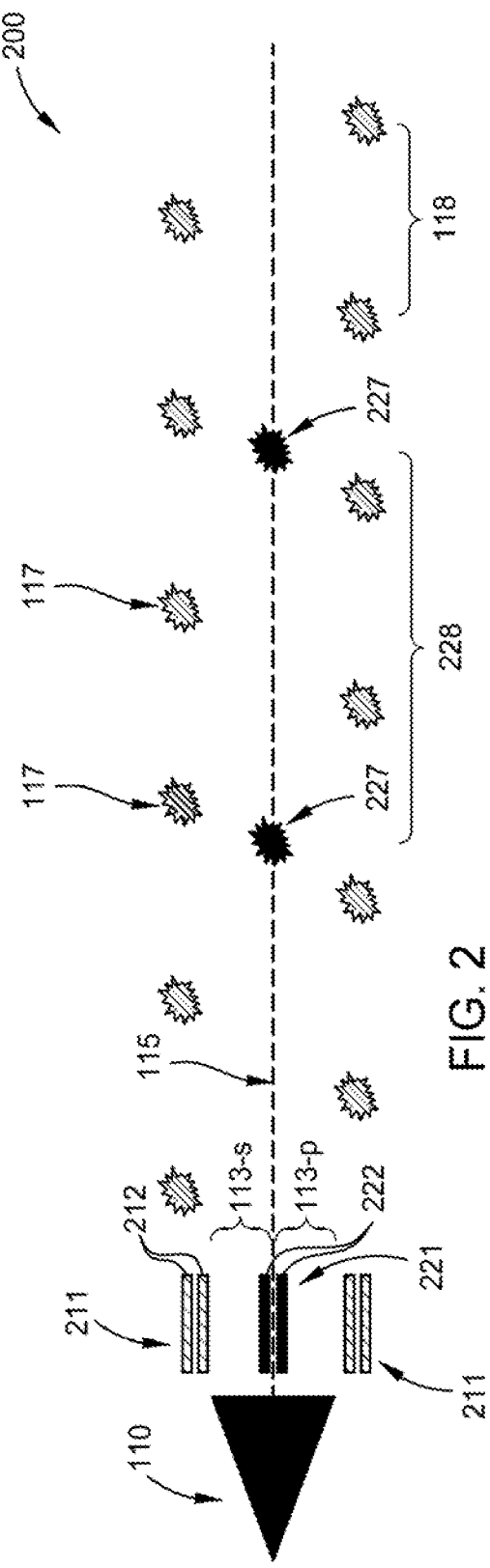

SURVEYING WITH LOW FREQUENCY IMPULSE SOURCES

CROSS REFERENCE TO RELATED APPLICATIONS

This application claims benefit of U.S. Provisional Patent Application Ser. No. 62/887,966, filed Aug. 16, 2019, entitled "Enhancing Low-Frequency Content of Seismic Data by Designing Gun Volume and Shotpoint Intervals," which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data which can be useful in the discovery and/or extraction of hydrocarbons from subsurface formations.

It is currently believed that the frequency content of seismic data is directly related to the output from the source (e.g., one or more impulse source elements, such as an airgun or an array of airguns). For example, various authors have described enhancing low frequency survey data by improving the low frequency content of all of the sources in the survey. With all other factors held constant, larger-volume seismic sources tend to produce lower-frequency signals. However, a survey utilizing only larger-volume airguns may suffer from unacceptably sparse data due to the filling requirements for the larger-volume airguns.

Most often, the largest airgun volume used in source arrays is about 250 cubic inches to about 300 cubic inches. It is thought to be unpractical to use airguns with larger volumes, since it takes a long time (or larger air compressor capacity) to sufficiently fill large-volume airguns. Since a source vessel tows, recharges, and activates the sources at certain intervals, there may not be sufficient time to fill large-volume source elements between shotpoints. For example, a 250 cubic inches airgun may take about 5 seconds to about 7 seconds to fill, depending on air compressor capabilities.

Smaller-volume source elements are thought to provide several advantages over larger-volume source elements. For example, decreasing the source size allows for deployment of more sources without increasing the compressed air supply. This may provide for better distributions of smaller sources across a given area. This also may provide for greater flexibility in terms of source vessel capability. Smaller sources may be cheaper to purchase and/or maintain. Smaller sources may exhibit more point-like signatures with less directivity variation. There may be positive environmental aspects when using smaller sources with lower peak output. Additionally, utilizing many smaller sources with different volumes may increase the peak-to-bubble ratio. Note that the peaks of the different volume sources may align, and hence would sum constructively. However, the bubbles of the different volume sources would have different bubble periods, and hence would not sum constructively. Utilizing many smaller source elements may give a larger peak amplitude. The filling time is quicker for many small guns rather than one (or just a few) large guns, so the many smaller sources can be fired more often with a shorter distance than with larger guns. When using many smaller sources, in the event of failure of one or just a few guns, the survey may continue (e.g., either by activating spare guns, or simply utilizing the working guns) so long as the effect on the farfield signature is within the specified survey criteria.

Many marine seismic surveys use single- or dual-source configurations. Some marine seismic surveys utilize a triple-source configuration. Choice of single-, dual- or triple-source survey configuration may be based upon factors such as available vessel capacity, desired spatial crossline sampling, planned streamer separation, and/or streamer spread width.

It would be beneficial to enhance low-frequency content of seismic data without increasing source vessel capacity and/or air compressor size, and without compromising currently-available shotpoint intervals.

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1 illustrates operation of a conventional marine survey system.

FIG. 2 illustrates operation of a marine survey system having a large-volume seismic source.

DETAILED DESCRIPTION

Figure 3:
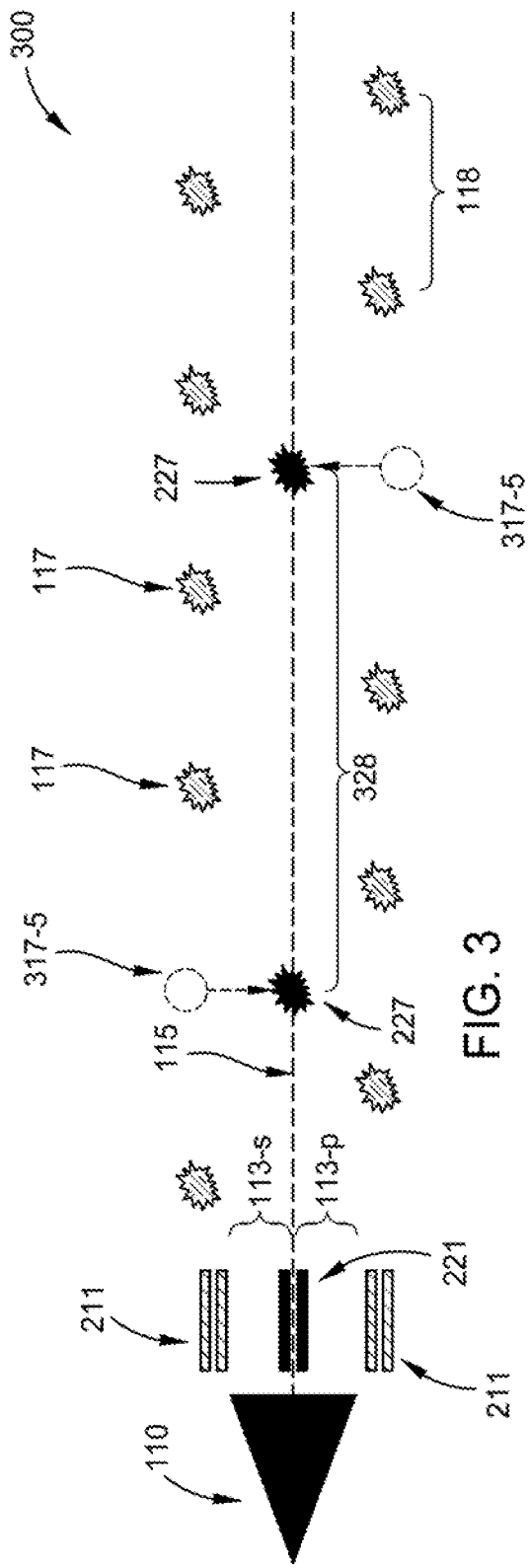
FIG. 3 illustrates operation of another marine survey system having a large-volume seismic source.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

As used herein, the term "airgun" generally refers to a marine seismic source with a characteristic impulsive release of air. The impulse force of an airgun may be characterized by a rapid (e.g., less than 10 ms) expulsion of air from the airgun into surrounding water. The impulse force may be further characterized by the air being under high pressure (e.g., about 100 bar to about 200 bar, or higher) prior to release into the surrounding water.

"Axial direction" shall mean, for an object or system having a canonical axis, a direction along a proximal portion of the axis.

"Lateral direction" shall mean, for an object or system having a canonical axis, a direction perpendicular to a proximal portion of the axis. Often, "lateral direction" is understood to be at a fixed depth.

"Inline direction" shall mean, for equipment towed by a vessel, a direction along (or parallel to) the path traversed by the vessel.

"Crossline direction" shall mean, for equipment towed by a vessel, a fixed-depth direction perpendicular to the path traversed by the vessel.

"Offset" shall mean the nominal inline distance between the source and the receiver.

"Cable" shall mean a flexible, axial load carrying member that also comprises electrical conductors and/or optical conductors for carrying electrical power and/or signals between components.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

"Obtaining" data or information shall mean any method or combination of methods of acquiring, collecting, synthesizing, designing, or accessing data or information, including, for example, directly measuring or sensing a physical property, receiving transmitted data, selecting data from a group of physical sensors, identifying data in a data record, generating data or information manually and/or programmatically, and retrieving data or information from one or more data libraries.

The term "near-real time" refers to the time delay resulting from detecting, sensing, collecting, filtering, amplifying, modulating, processing, and/or transmitting relevant data or attributes from one point (e.g., an event detection/sensing location) to another (e.g., a data monitoring location). In some situations, a time delay from detection of a physical event to observance of the data representing the physical event is insignificant or imperceptible, such that near-real time approximates real time. Near-real time also refers to longer time delays that are still short enough to allow timely use of the data to monitor, control, adjust, or otherwise impact subsequent detections of such physical events.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the surveying operation. As another example, the two or more events may occur during time periods that overlap by about 40% to about 100% of either period.

Full wavefield inversion (FWI) refers to data acquisition and/or processing techniques that include simulating seismic source energy, propagating the energy (as a wavefield) through a model of the area being surveyed, making simulated measurements of the propagated energy, comparing the simulated seismic measurements with the actual seismic measurements, and iteratively updating the model according to a loss function based on the comparison. In some embodiments, the complexity of calculating the wavefield propagation may limit the amount of frequencies that are useful for FWI. In some embodiments, limiting the frequencies used in the simulation may increase the speed of calculating and/or the accuracy with which the iterative modeling converges. Consequently, marine surveying may advantageously collect only the frequencies which are the most useful for FWI. For example, the desired frequencies may be lower frequencies, e.g. below 25 Hz, below 15 Hz, below 10 Hz, below 8 Hz, below 2 Hz, etc.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine seismic survey methods and apparatuses, and, at least in some embodiments, to novel surveying system configurations, and their associated methods to obtain and/or use low-frequency data.

One of the many potential advantages of the embodiments of the present disclosure, is that low frequency-data may be acquired in conjunction with standard survey data. Another potential advantage includes improved survey design for large-volume seismic sources used in conjunction with standard-volume seismic sources. For example, sampling preferences for low frequency data (e.g., about 2 Hz to about 30 Hz) may be less dense than for data in higher frequency ranges (e.g., about 30 to about 120 Hz). For example, low frequency data may be used primarily for velocity model building, rather than generating a seismic image (i.e., imaging). Hence, a low-frequency/large-volume seismic source may be activated at larger nominal shotpoint intervals than for standard-volume seismic sources. At least one embodiment of the present disclosure can provide low-frequency data for velocity model building using one or more large-volume source elements, for instance to provide low frequency-data for inversion (e.g., FWI). For example, deep targets may be imaged by utilizing low-frequency data with FWI to generate a velocity model for imaging. Embodiments of the present disclosure can thereby be useful in the discovery and/or extraction of hydrocarbons from subsurface formations. Another potential advantage includes increased low frequency content that may penetrate deeper into the subsurface geology. Consequently, it may be possible to acquire seismic data for imaging below obstructing geobodies (e.g., salt, basalt etc.).

In some embodiments, large-volume seismic sources may be utilized simultaneously with standard-volume seismic sources. In some embodiments, a survey may utilize two standard-volume seismic sources with one large-volume seismic source. In some embodiments, the standard-volume seismic sources may be activated at standard nominal shotpoint intervals for a dual-source survey (e.g., about 25 m between activations). In some embodiments, the large-volume seismic source may be activated at large nominal shotpoint intervals (e.g., about 150 m between activations). In some embodiments, a survey may be designed to utilize large-volume source elements simultaneously with standard-volume source elements. For example, the nominal shotpoint intervals for each seismic source may be selected based on vessel speed, filling time of the seismic source, and/or the sampling preferences for data from the various frequency ranges.

It should be appreciated that the bubble oscillation period for a source may described by the modified Rayleigh-Willis formula:

$$T = k \frac{P^{1/3} * V^{1/3}}{P_h^{5/6}} \quad (1)$$

where k is a constant, P is the source's firing pressure, $P_h$ is hydrostatic pressure (depth) and V is the volume. It is currently believed that, since the fundamental frequency of an impulse source element is 1/T, increasing the volume of the impulse source element lowers the frequency of the emitted signal. Note that some prior attempts to reduce source ghost effects by towing sources deeper have failed, in part due to bubble oscillation period's dependence upon hydrostatic pressure (depth), thereby compromising the low frequency output.

A seismic source may be constructed by coupling impulse source elements (e.g., airguns) together sufficiently close to allow interacting and/or merging of the bubbles from the source elements. The bubble oscillation period of a seismic source may be approximately proportional to the cubic root of the total volume of the source elements that make up the seismic source.

FIG. 1 illustrates operation of a conventional marine survey system 100 having a source vessel 110 towing two seismic sources 111 (towing equipment not shown). Note that source vessel 110 may also tow one or more streamers (not shown) in various embodiments. As illustrated, each seismic source 111 includes two source subarrays 112. Each source subarray 112 may include one or more impulse source elements (e.g., airguns) connected by a cable supplying power, air supply, and/or activation signaling. As illustrated, each source element of each seismic source 111 is a standard-volume source element (i.e., volume less than about 1200 cubic inches). In some embodiments, each standard-volume source element may have a volume of about 20 cubic inches to about 300 cubic inches. A variety of suitable standard-volume source elements are commercially available, such as Teledyne Bolt Model 1500LL Source available from Teledyne Marine-BOLT of Houston, Tex. Source vessel 110 travels along a survey path indicated by midline 115.

As illustrated, the seismic sources 111 are equally distributed on each side of the midline 115. For example, marine survey system 100 includes one seismic source 111 at a crossline-source displacement 113-p to the port-side of midline 115, and one seismic source 111 at a crossline-source displacement 113-s to the starboard-side of midline 115. Each crossline-source displacement 113 may be about 25 m to about 100 m, for example, about 50 m. It should be understood that various embodiments may have a larger crossline-source displacement 113 on one side of midline 115 than on the other side of midline 115. Other configurations of seismic sources 111 are possible, as would be understood by a person of ordinary skill in the art.

FIG. 1 also illustrates a nominal firing plan for operation of conventional marine survey system 100. As illustrated, the seismic sources 111 are activated in a flip-flop pattern. That is, the port seismic source 111 is activated, as indicated by first shotpoint 117-1, then the starboard seismic source 111 is activated, as indicated by second shotpoint 117-2, then the port seismic source 111 is once again activated, as indicated by third shotpoint 117-3, and so on. The distance between two consecutive shotpoints by the same seismic source 111 is given by nominal shotpoint interval 118 (e.g., about 20 m to about 75 m, or about 50 m). As illustrated, the nominal shotpoint intervals are regular and equal along the survey path and between the port seismic source 111 and the starboard seismic source 111. It should be understood that the shotpoints could be distributed at irregular shotpoint intervals, including randomized interval lengths, for example to improve de-blending.

FIG. 2 illustrates operation of a marine survey system 200 having a source vessel 110 towing two standard-volume seismic sources 211 and one large-volume seismic source 221 (towing equipment not shown). As before, source vessel 110 may also tow one or more streamers (not shown) in various embodiments. The standard-volume seismic sources 211 may be configured similarly to the seismic sources 111 of FIG. 1. For example, each standard-volume seismic source 211 may include two source subarrays 212. Each source subarray 212 may include one or more standard-volume source elements (e.g., airguns), connected by a cable supplying power, air supply, and/or activation signaling. The large-volume seismic source 221 may be designed to output low frequency (e.g., about 2 Hz to about 30 Hz) signals. As illustrated, large-volume seismic source 221 includes two source subarrays 222. Each source subarray 222 may include one or more impulse source elements (e.g., airguns), including at least one large-volume source element (i.e., volume greater than about 1200 cubic inches), connected by a cable supplying power, air supply, and/or activation signaling.

As illustrated, the standard-volume seismic sources 211 are equally distributed on each side of the midline 115, while the large-volume seismic source 221 is centered on midline 115. As before, each crossline-source displacement 113 may be about 25 m to about 100 m, for example, about 50 m. It should be understood that various embodiments may have a larger crossline-source displacement 113 on one side of midline 115 than on the other side of midline 115. Other configurations of seismic sources 211, 221 are possible, as would be understood by a person of ordinary skill in the art.

FIG. 2 also illustrates a nominal firing plan for operation of marine survey system 200. As before, the standard-volume seismic sources 211 are activated in a flip-flop pattern. As illustrated, large-volume seismic source 221 is activated at shotpoints 227, with a regular nominal shotpoint interval 228 (e.g., about 50 m to about 200 m, or about 100 m) that is at least twice the nominal shotpoint interval 118 of each standard-volume seismic source 211. It should be appreciated that large-volume source elements may take much longer time to fill than standard-volume source elements, so large-volume seismic source 221 may be activated at larger nominal shotpoint intervals than for the standard-volume seismic sources 211. In some embodiments, the design of the nominal shotpoint interval for the large-volume seismic source 221 may take into account the vessel speed, the filling time of the large-volume seismic source 221, and the sampling preferences for the low frequency data. For example, large-volume seismic source 221 may be activated at about 40 second increments, consistent with a shotpoint interval 228 of about 100 m. In some embodiments, data acquired (e.g., detected signals) with marine survey system 200 may be de-blended during data processing to separate signals responsive to activating the standard-volume seismic source 211 from signals responsive to activating the large-volume seismic source 221.

FIG. 3 illustrates operation of another marine survey system 300. In many ways, components and survey operations of marine survey system 300 are similar to those of marine survey system 200. As before, the standard-volume seismic sources 211 are equally distributed on each side of the midline 115, while the large-volume seismic source 221 is centered on midline 115. Other configurations of seismic source 211,221 are possible, as would be understood by a person of ordinary skill in the art.

FIG. 3 also illustrates a nominal firing plan for operation of marine survey system 300. As illustrated, the standard-volume seismic sources 211 are activated in a modified flip-flop pattern, so that every fifth shotpoint 317-5 of each standard-volume seismic source 211 is skipped in an alternating fashion. When source vessel 110 reaches the point where a fifth shotpoint 317-5 would have been fired, large-volume seismic source 221 is activated in its place. Thus, large-volume seismic source 221 is activated with a regular nominal shotpoint interval 328 (e.g., about 75 m to about 250 m, or about 150 m) that is 2.5-times the nominal shotpoint interval 118 of each standard-volume seismic source 211. For example, large-volume seismic source 221 may be activated at about 60 second increments, consistent with a shotpoint interval 328 of about 150 m.

Figure 4:
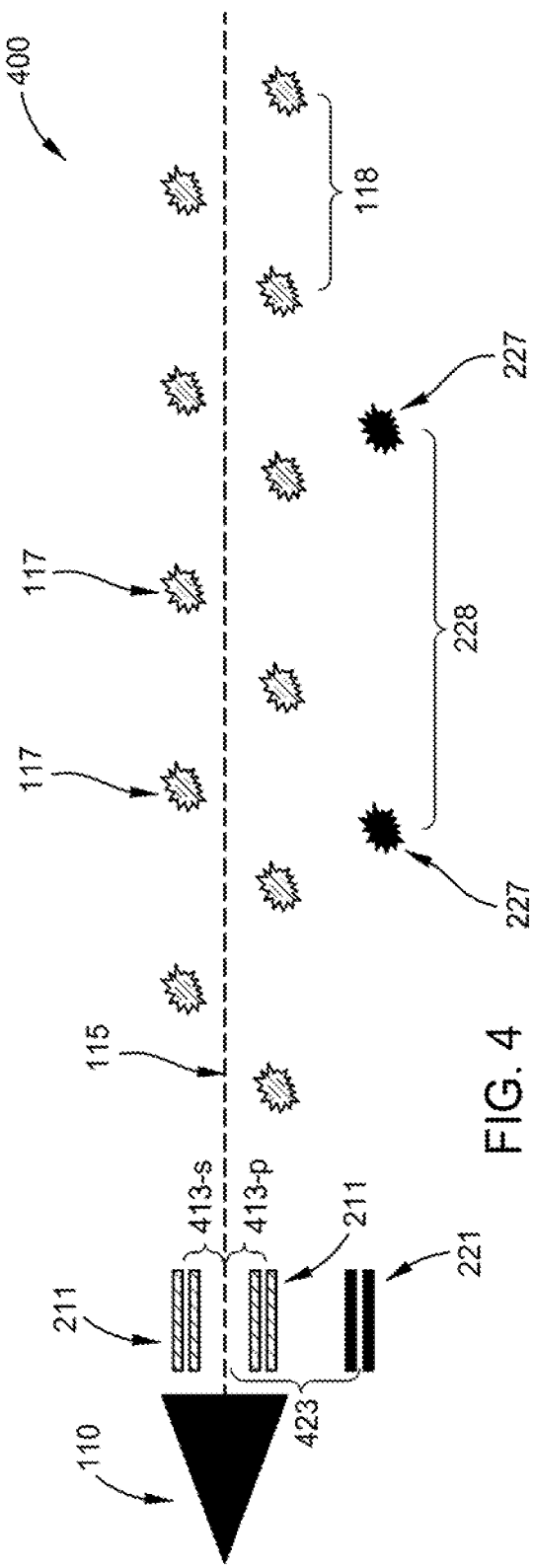
FIG. 4 illustrates operation of another marine survey system having a large-volume seismic source.

FIG. 4 illustrates operation of another marine survey system 400. In many ways, components and survey operations of marine survey system 400 are similar to those of marine survey systems 200, 300. As before, the standard-volume seismic sources 211 are equally distributed on each side of the midline 115. As illustrated in FIG. 4, each crossline-source displacement 413 may be smaller than previous crossline-source displacement 113. For example, crossline-source displacement 413 may be about 10 m to about 50 m, for example, about 25 m. In marine survey system 400, the large-volume seismic source 221 may be displaced to one side of midline 115, with a larger crossline-source displacement 423 than the crossline-source displacement 413 of the standard-volume seismic source 211. For example, crossline-source displacement 423 may be about 30 m to about 150 m, for example, about 75 m.

FIG. 4 also illustrates a nominal firing plan for operation of marine survey system 400. Similar to the system 200 illustrated in FIG. 2, FIG. 4 illustrates activation of the standard-volume seismic sources 211 in a flip-flop pattern, and activation of the large-volume seismic source 221 at shotpoints 227, with a regular nominal shotpoint interval 228 (e.g., about 50 m to about 200 m, or about 100 m) that is twice the nominal shotpoint interval 118 of each standard-volume seismic source 211. It should be appreciated that other firing plans (e.g., as illustrated in FIG. 3) with other nominal shotpoint intervals may be selected for the standard-volume seismic source 211 and/or the large-volume seismic source 221.

A variety of configurations may be employed when designing marine surveys with large-volume seismic sources used in conjunction with standard-volume seismic sources. For example, each seismic source may include more or fewer subarrays than the two-subarray sources discussed above. The standard-volume seismic source 211 may include 1 to 6 source subarrays 212, each having 5 to 10 standard-volume source elements of volumes of about 20 cubic inches to about 300 cubic inches each. Consequently, the total volume of a standard-volume seismic source 211 may be up to about 7000 cubic inches. The large-volume seismic source 221 includes at least one source subarray 222, having 1 to 6 large-volume source elements of volumes of about 1200 cubic inches to about 6000 cubic inches each. Consequently, the total volume of a large-volume seismic source 221 may be more than 12000 cubic inches. Additionally, some configurations may include more than three seismic sources. For example, marine survey systems 300 and 400 may be combined, resulting in a configuration of four standard-volume seismic sources 211 and two large-volume seismic sources 221, with one large-volume seismic source 221 centered on midline 115, and one large-volume seismic source 221 displaced to one side of midline 115.

Figure 5A:
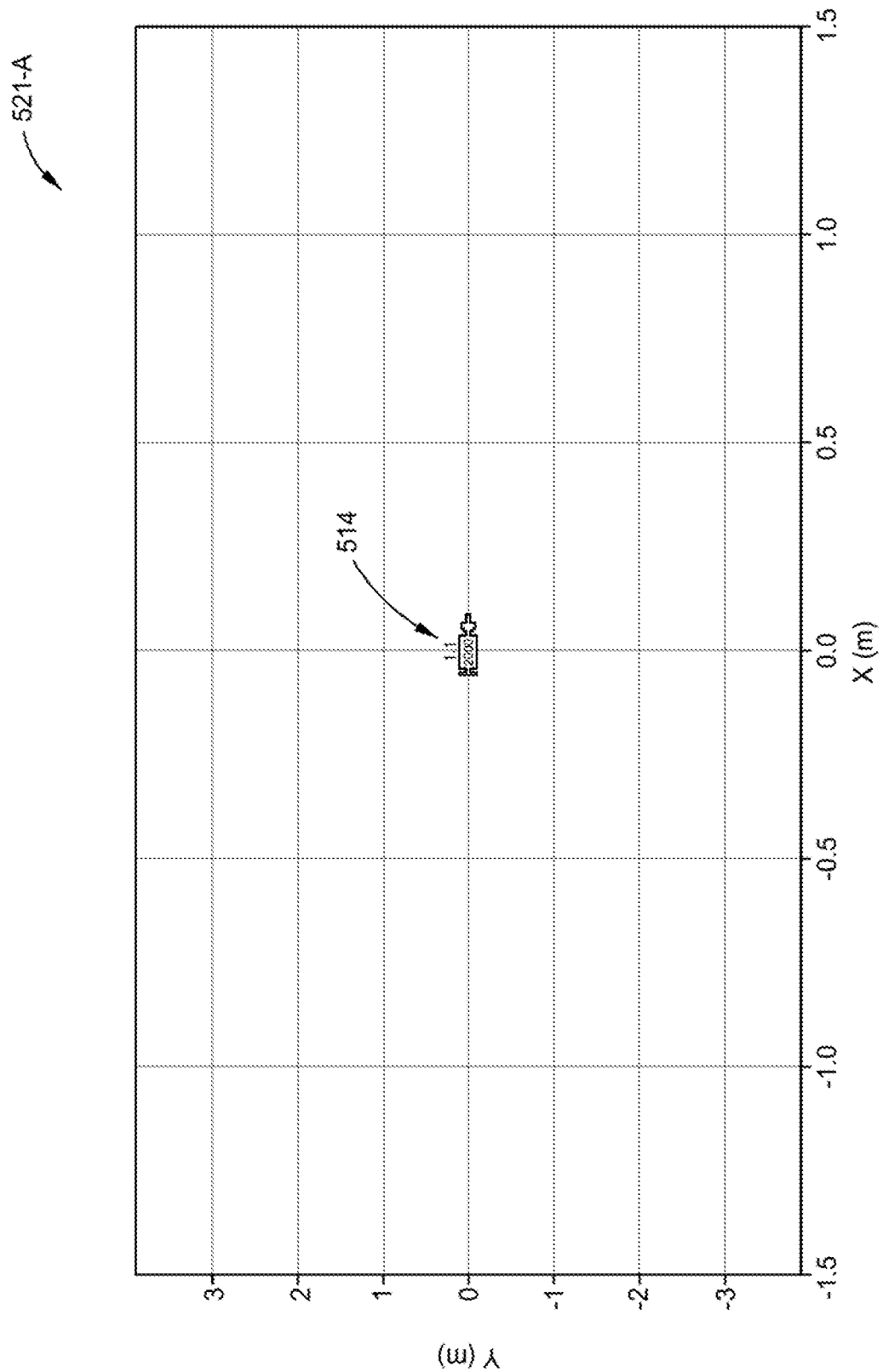
FIG. 5A illustrates an exemplary large-volume seismic source configuration for marine survey systems as in FIGS. 2-4.
Figure 5B:
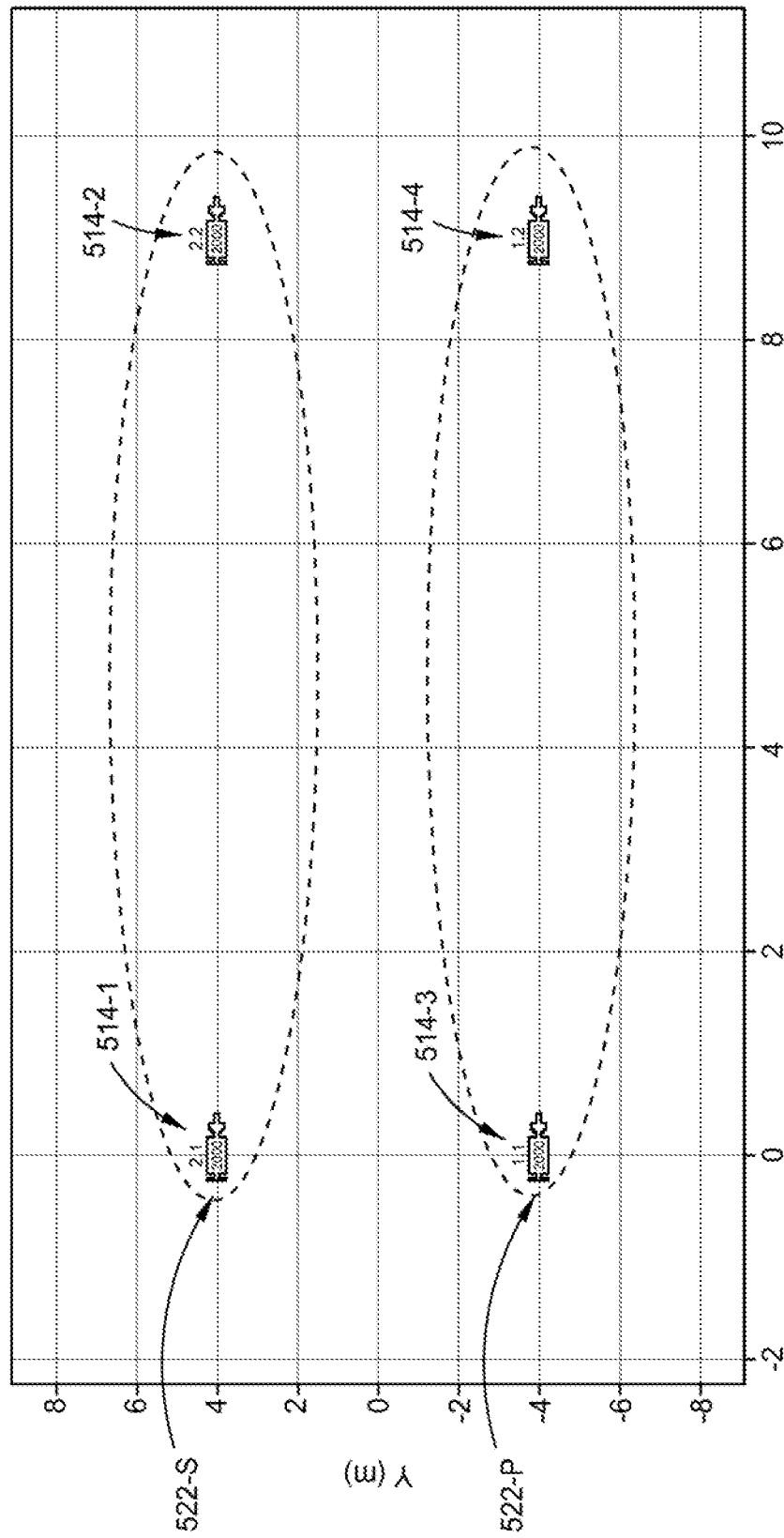
FIG. 5B illustrates another exemplary large-volume seismic source configuration for marine survey systems as in FIGS. 2-4.

FIGS. 5A-5B illustrate several exemplary large-volume seismic source configurations for marine survey systems as disclosed above. For comparison purposes, FIG. 5C illustrates an exemplary standard-volume seismic source configuration.

FIG. 5A illustrates a large-volume seismic source 521-A that includes a single 2000 cubic inches large-volume source element 514 (e.g., an airgun).

FIG. 5B illustrates a large-volume seismic source 521-B that includes four 2000 cubic inches large-volume source elements 514. For example, large-volume source element 514-1 and large-volume source element 514-2 may make up a starboard-side source subarray 522-S, while large-volume source element 514-3 and large-volume source element 514-4 may make up a port-side source subarray 522-P (connections or cables not shown). Thus, an 8000 cubic inches large-volume seismic source configuration may be provided by the four 2000 cubic inches large-volume source elements 514 of FIG. 5B. It should be appreciated that other configurations may be utilized to provide an 8000 cubic inches large-volume seismic source, such as two large-volume source elements of 4000 cubic inches each. It should be appreciated that similar configurations may be utilized to provide other sizes of large-volume seismic sources, such as a similar distribution of four large-volume source elements, but with each source element being 1000 cubic inches, to provide a 4000 cubic inches large-volume seismic source.

Figure 5C:
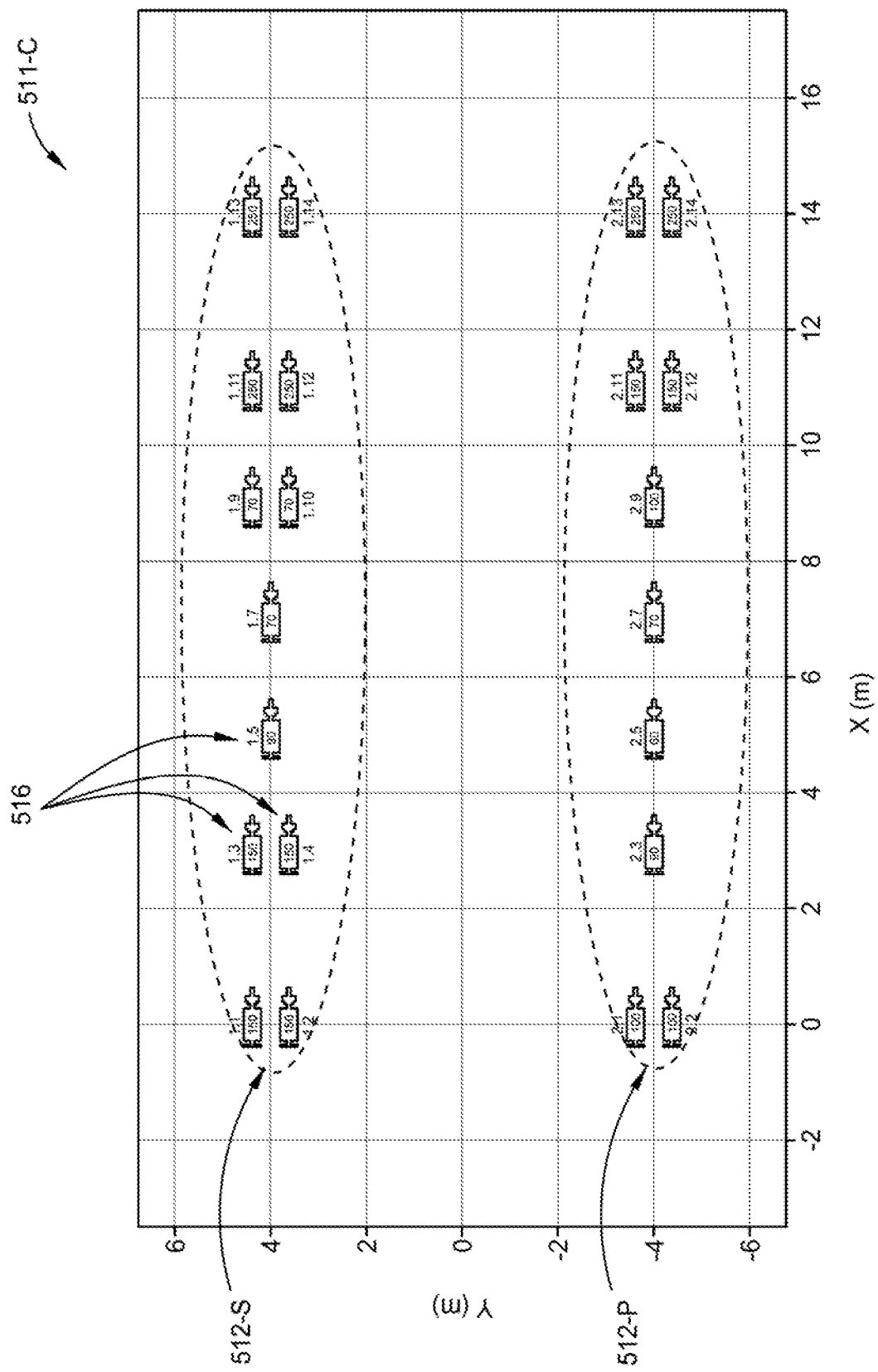
FIG. 5C illustrates, for comparison purposes, an exemplary standard-volume seismic source configuration.

FIG. 5C illustrates a standard-volume seismic source 511-C that includes a starboard-side source subarray 512-S and a port-side source subarray 512-P (connections or cables not shown). Each source subarray 512 includes a variety of standard-volume source elements 516 distributed at seven inline distances. As illustrated, starboard-side source subarray 512-S includes two clusters of two 150 cubic inches airguns, a 90 cubic inches airgun, a 70 cubic inches airgun, a cluster of two 70 cubic inches airguns, and two clusters of two 250 cubic inches airguns. As illustrated, port-side source subarray 512-P includes a cluster of two 100 cubic inches airguns, a 90 cubic inches airgun, a 60 cubic inches airgun, a 70 cubic inches airgun, a 100 cubic inches airgun, a cluster of two 150 cubic inches airguns, and a cluster of two 250 cubic inches airguns. Thus, a 3220 cubic inches standard-volume seismic source configuration may be provided by the variety of standard-volume source elements 516 of FIG. 5C.

Figure 6:
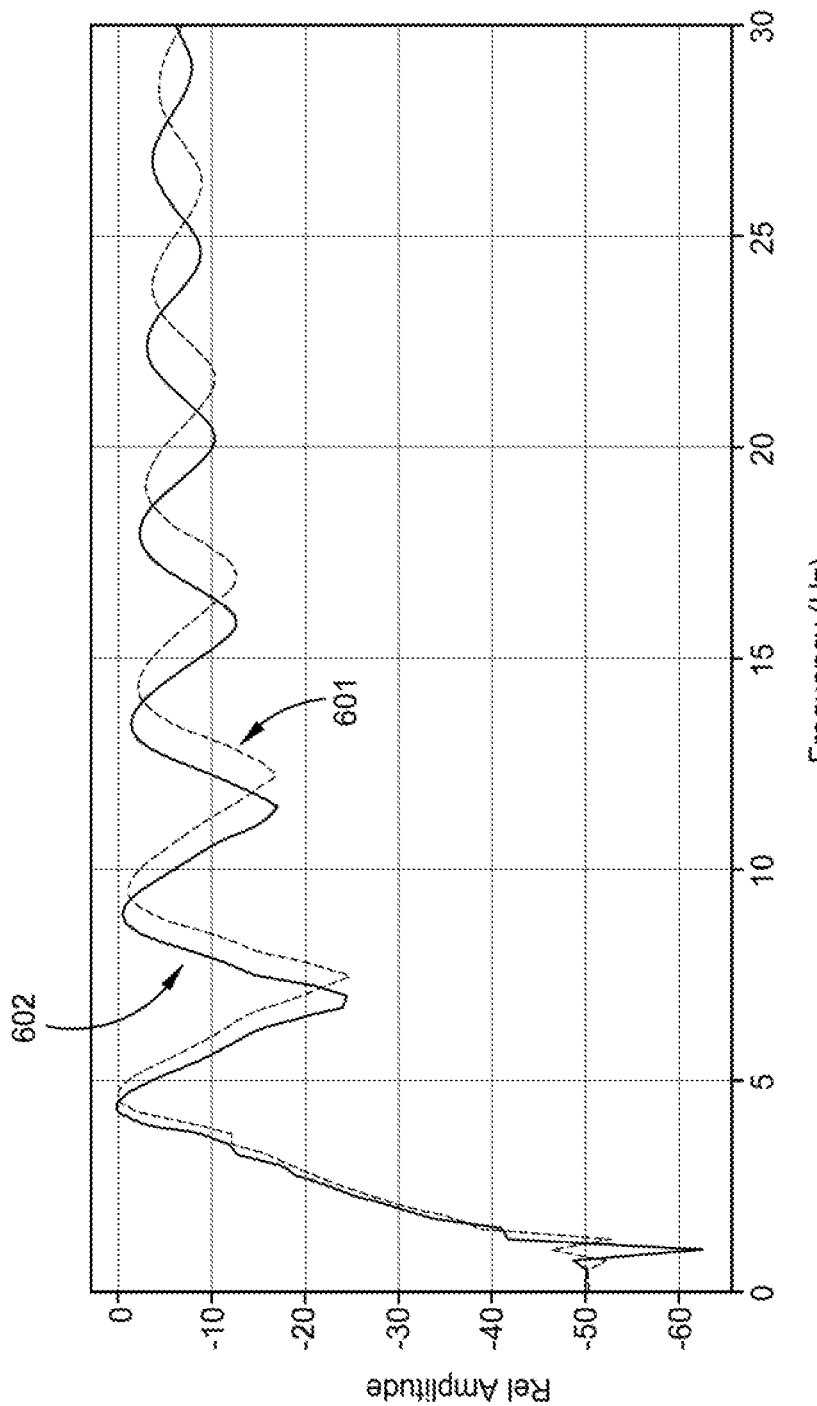
FIG. 6 illustrates a comparison of farfield signatures in the form of individually normalized amplitude spectra.

FIG. 6 illustrates a comparison of farfield signatures in the form of individually normalized amplitude spectra. Line 601 illustrates a modeled farfield signature for a single 2000 cubic inches large-volume source element (e.g., large-volume seismic source 521-A from FIG. 5A). Line 602 illustrates a modeled farfield signature for an 8000 cubic inches large-volume seismic source made up of four 2000 cubic inches large-volume source elements (e.g., large-volume seismic source 521-B from FIG. 5B). Each signature is calculated at a representative distance of about 9000 m, directly below the source (e.g., dip of about 0° and azimuth of about 0°). Note that the frequency spectra are slightly different when using several airguns, rather than a single airgun. It should be understood that the survey design may dictate a source configuration, which may vary by operational and/or data acquisition conditions. For example, the survey design may specify a desired shape of the source signature, thereby a desired source configuration. As another example, the survey design may dictate desired shotpoint intervals, thereby the preferred airgun filling time, and consequently a number of airguns and volume of each (e.g., 4×2000 cubic inches vs 1×2000 cubic inches). As another example, the data acquisition parameters may indicate a desired energy, amplitude, and/or frequency of source signal, and thereby a number and volume of sources in the source array.

Figure 7:
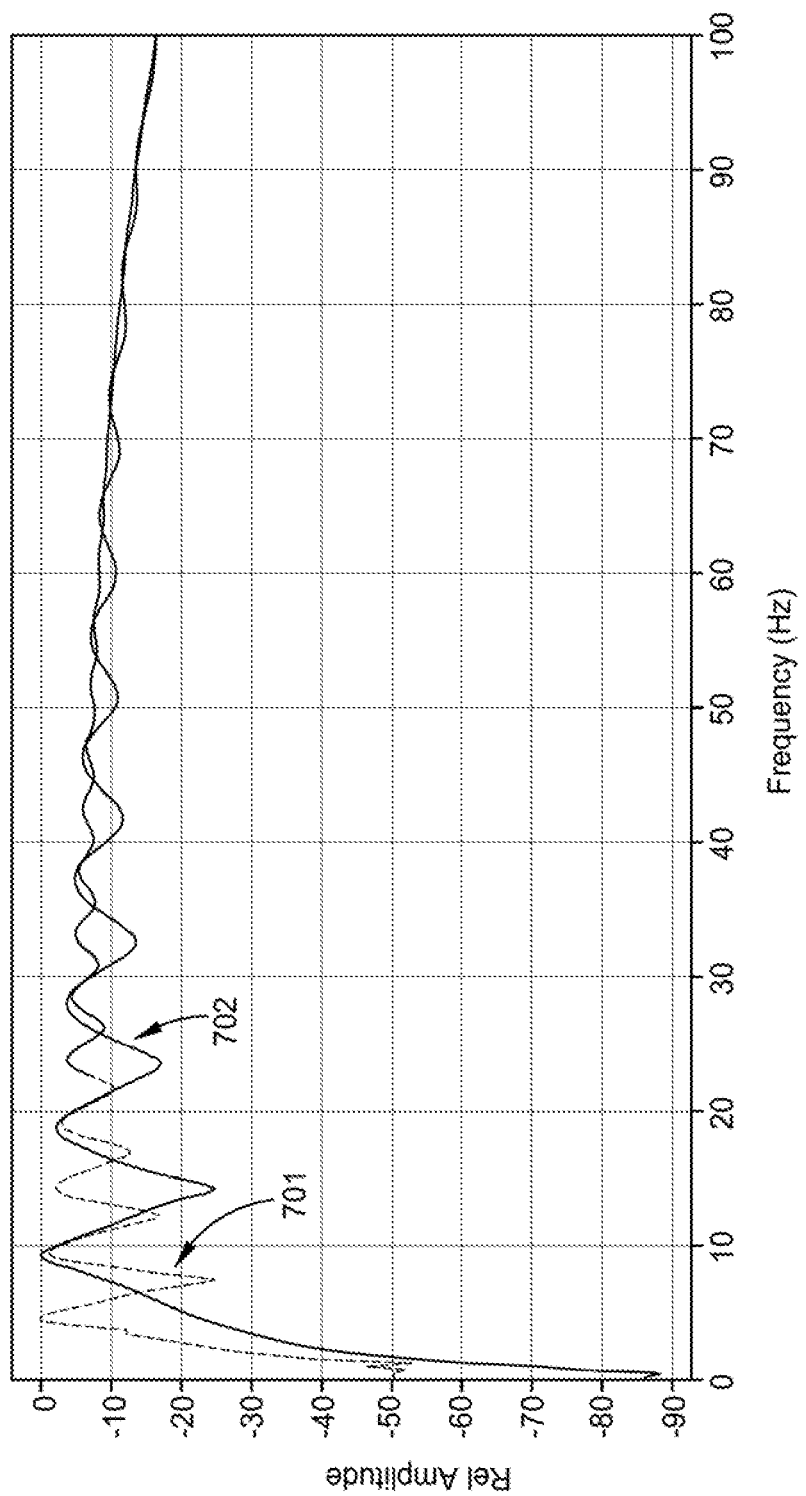
FIG. 7 illustrates another comparison of farfield signatures in the form of individually normalized amplitude spectra.

FIG. 7 illustrates another comparison of farfield signatures in the form of individually normalized amplitude spectra. Line 701 illustrates a modeled farfield signature for a 2000 cubic inches large-volume source element (e.g., large-volume seismic source 521-A from FIG. 5A). Line 702 illustrates a modeled farfield signature for a 250 cubic inches standard-volume source element. Each signature is representative of a distance of about 9000 m, a dip of about 0°, an azimuth of about 0°, and a geosp of 2. Note that line 701 has a low-frequency peak at about 5 Hz, while line 702 does not peak until about 10 Hz. The difference in low-frequency peak indicates that large-volume source elements may generate better low-frequency data than standard-volume source elements. Note that line 701 has discernable high-frequency peaks at about 40 Hz to about 60 Hz, while line 702 discernably peaks as high as 60 Hz to about 70 Hz. The difference in high-frequency peak indicates that standard-volume source elements may generate better high-frequency data than large-volume source elements.

Figure 8:
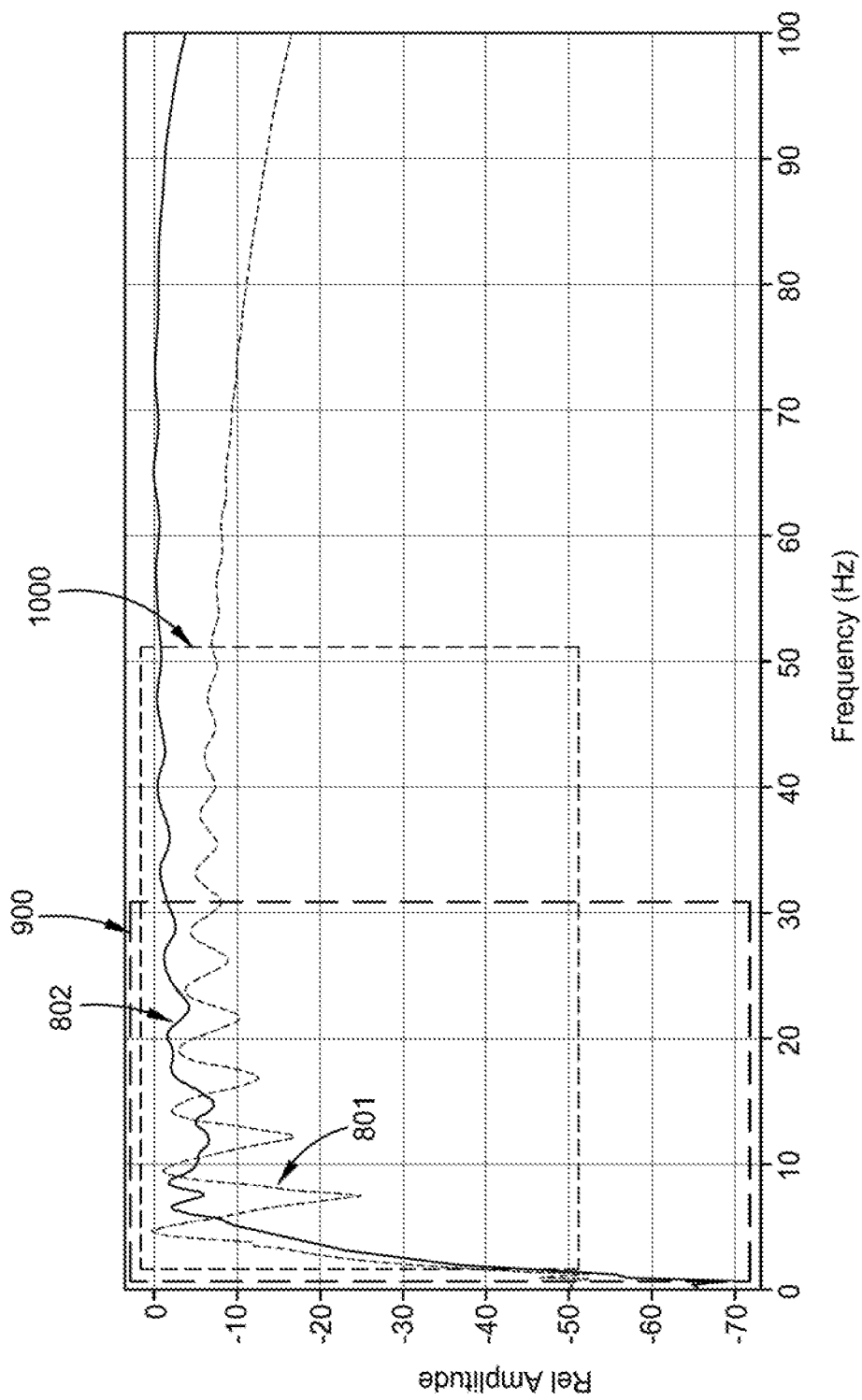
FIG. 8 illustrates another comparison of farfield signatures in the form of individually normalized amplitude spectra.

FIG. 8 illustrates another comparison of farfield signatures in the form of individually normalized amplitude spectra. Line 801 illustrates a modeled farfield signature for a 2000 cubic inches large-volume source element (e.g., large-volume seismic source 521-A from FIG. 5A). Line 802 illustrates a modeled farfield signature for a 3220 cubic inches standard-volume seismic source (e.g., standard-volume seismic source 511-C from FIG. 5C). Each signature is calculated at a representative distance of about 9000 m, directly below the source (e.g., dip of about 0° and azimuth of about 0°). Note that line 802 has low-frequency peaks at about 5 Hz to about 10 Hz, unlike line 702 of FIG. 7. The difference in low-frequency peak indicates that a large-volume seismic source may generate better low-frequency data than a standard-volume seismic source. Note that line 802 has high amplitude from about 40 Hz to about 90 Hz. The high amplitude at high-frequencies indicates that a large-volume seismic source having an array of source elements may generate more useful high-frequency data than a single large-volume source element.

Figure 9:
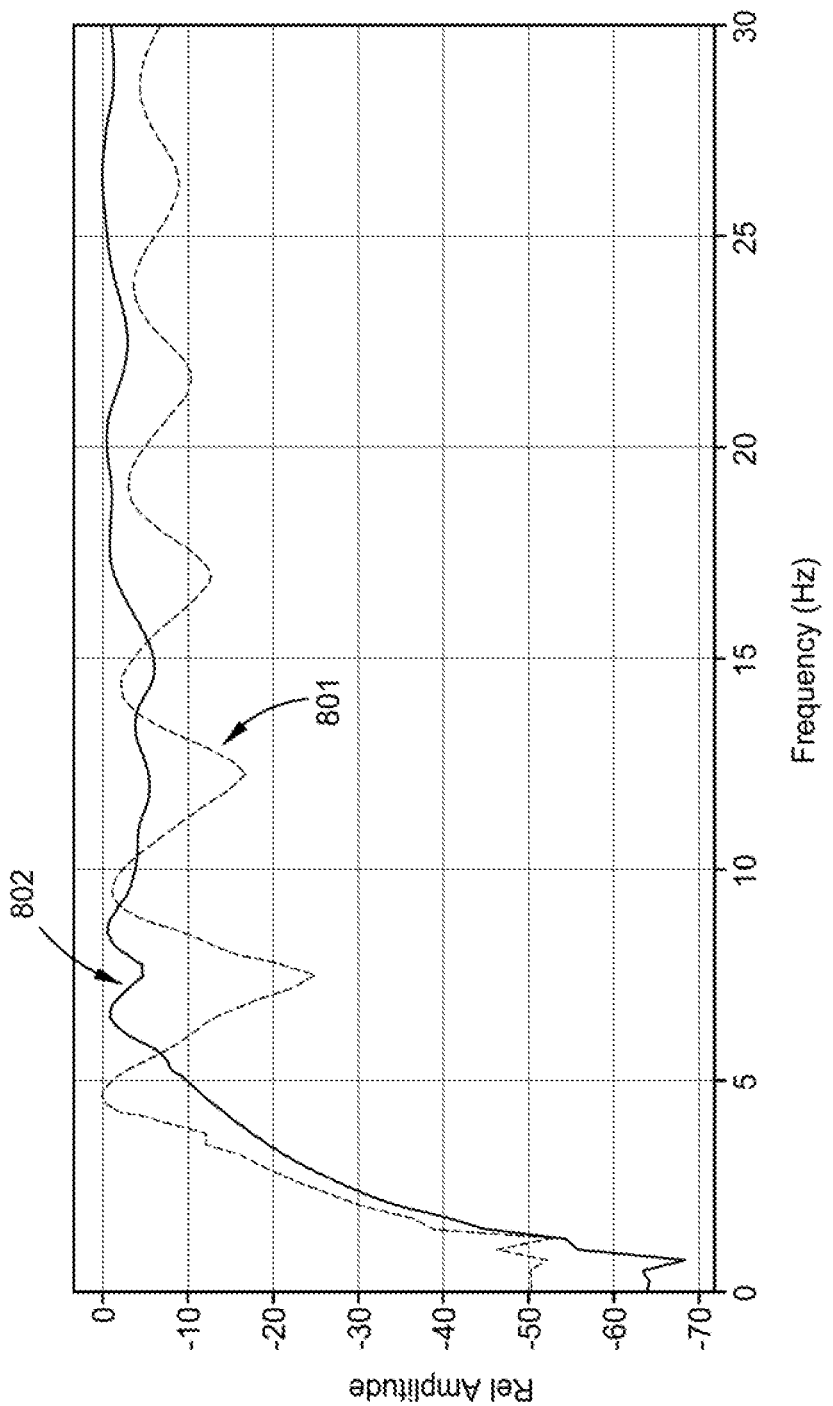
FIG. 9 illustrates a portion of FIG. 8, with zoomed-in focus.

FIG. 9 illustrates portion 900 of FIG. 8, zoomed-in to focus on an area around a frequency range of about 0 Hz to about 30 Hz.

Figure 10:
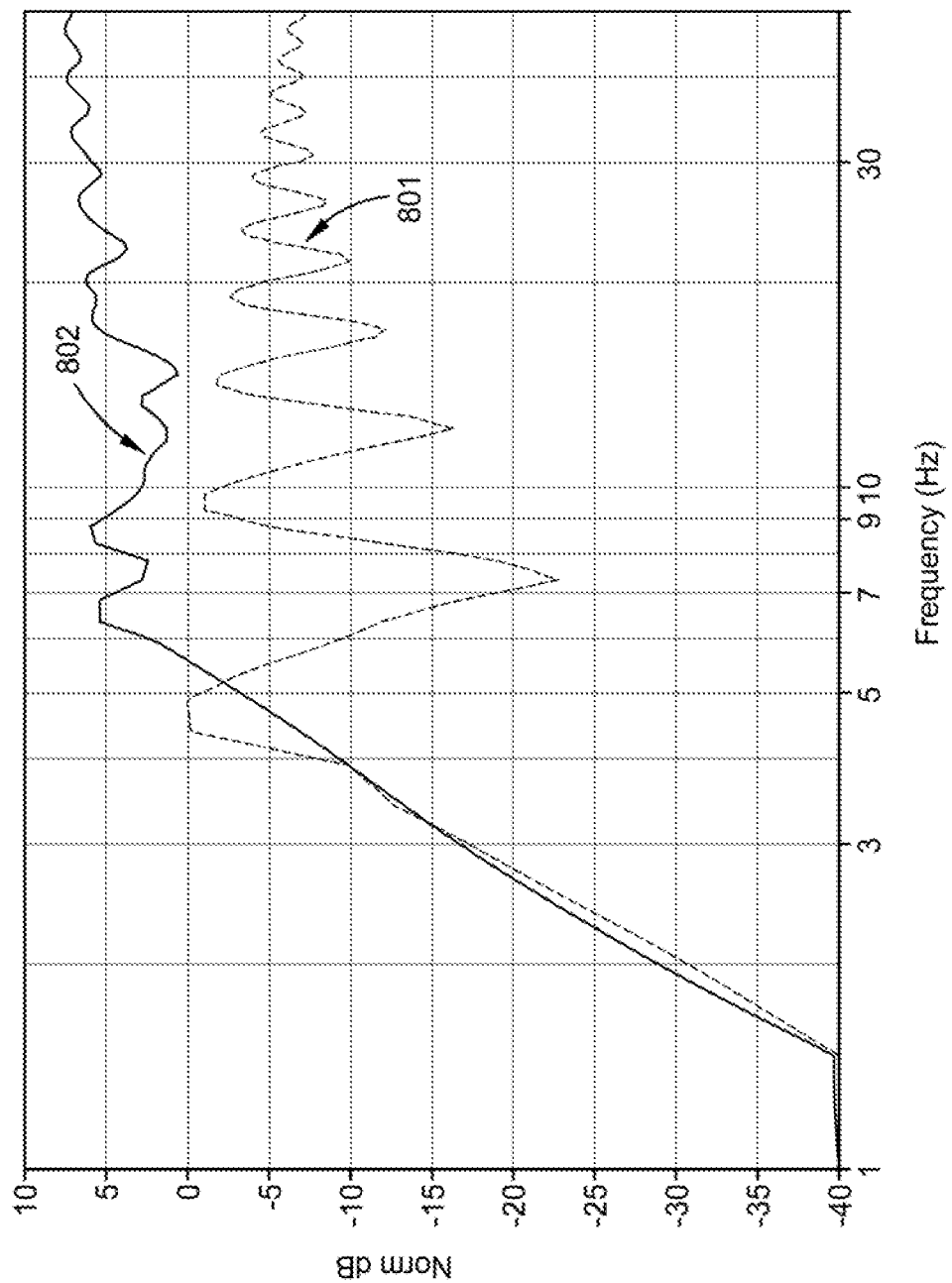
FIG. 10 illustrates another portion of FIG. 8 on a log frequency scale.

FIG. 10 illustrates portion 1000 of FIG. 8 on a log frequency scale. In FIG. 10, the graphs are normalized at the same scale, rather than being individually normalized. Note that line 802 (the 3220 cubic inches standard-volume seismic source) has a higher amplitude at almost all frequencies than line 801 (2000 cubic inches large-volume source element). The higher amplitude of line 802 is indicative, at least in part, of the larger overall volume and the increased number of sources. However, note that line 801 displays about 5 dB more energy at about 4 Hz to about 5 Hz. It is currently believed that this illustrates the potential for providing more source energy at low frequencies using individual large-volume source elements, rather than a large-volume seismic source having an array of source elements.

In some embodiments, a method may enhance the signal recorded at low frequencies in a seismic survey. The method may take advantage of the fact two-subarray seismic sources with smaller source elements may not lead to degradation of data quality when compared to single-source systems. In some embodiments, two-subarray seismic sources may be used in conjunction with or in lieu of a standard-volume source element. In some embodiments, otherwise spare source subarrays may be used to tow large-volume source elements. In some embodiments, the large-volume source elements may take longer to fill than standard-volume source elements, however, the large-volume source element may only be fired at large shotpoint intervals. In some embodiments, the method may be used in combination with long-offset streamers. It is currently believed that large-volume source elements utilized with long-offset streamers may enhance the low-frequency survey data.

In accordance with a number of embodiments of the present disclosure, a geophysical data product may be produced. The geophysical data product may include, for example, low-frequency data, a velocity model, a seismic image, geophysical data such as pressure data, particle motion data, particle velocity data, particle acceleration data, and any seismic image that results from using the methods and systems described above. Geophysical data, such as data previously collected by seismic sensors, electromagnetic sensors, depth sensors, location sensors, etc., may be obtained (e.g., retrieved from a data library). The geophysical data and/or the geophysical data product may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore. For example, velocity models may be produced with low-frequency data and/or used with FWI and/or imaging.

In an embodiment, a marine survey system includes: a standard-volume source element; a large-volume source element comprising an airgun having a volume greater than 1200 cubic inches; and a long-offset survey streamer.

In one or more embodiments disclosed herein, the standard-volume source element is a component of a first standard-volume seismic source, and the large-volume source element is a component of a large-volume seismic source.

In one or more embodiments disclosed herein, the marine survey system also includes a second standard-volume seismic source.

In one or more embodiments disclosed herein, the large-volume seismic source comprises a second standard-volume source element.

In an embodiment, a method of marine surveying includes: towing a standard-volume source element with a source vessel; towing, with the source vessel, a large-volume source element comprising an airgun having a volume greater than 1200 cubic inches; activating the large-volume source element at large shotpoint intervals; and activating the standard-volume source element at standard shotpoint intervals, wherein the large shotpoint intervals are at least twice as long as the standard shotpoint intervals.

In one or more embodiments disclosed herein, the large shotpoint intervals are in the range 30 to 100 seconds, and the standard shotpoint intervals are in the range 4 to 8 seconds.

In one or more embodiments disclosed herein, the large shotpoint intervals are in the range 75 m to 250 m, and the standard shotpoint intervals are in the range 10 m to 30 m.

In one or more embodiments disclosed herein, the standard-volume source element is a component of a first standard-volume seismic source, and the large-volume source element is a component of a large-volume seismic source.

In one or more embodiments disclosed herein, the method also includes towing a second standard-volume seismic source with the source vessel.

In one or more embodiments disclosed herein, the first standard-volume seismic source and the second standard-volume seismic source are towed on opposite sides of a survey path midline of the source vessel.

In one or more embodiments disclosed herein, the large-volume seismic source is towed along the survey path midline.

In one or more embodiments disclosed herein, the large-volume seismic source comprises a second standard-volume source element.

In one or more embodiments disclosed herein, the method also includes towing a second standard-volume seismic source with the source vessel; and activating the first standard-volume seismic source and the second standard-volume seismic source in a flip-flop pattern.

In one or more embodiments disclosed herein, the method also includes towing a second standard-volume seismic source with the source vessel; and activating the first standard-volume seismic source and the second standard-volume seismic source in a modified flip-flop pattern, wherein the modified flip-flop pattern includes: four alternating activations of the first standard-volume seismic source and the second standard-volume seismic source, the four alternating activations defining a regular series; and at a point where the regular series would result in a fifth activation of the first standard-volume seismic source and the second standard-volume seismic source, activating the large-volume seismic source instead of the first standard-volume seismic source or the second standard-volume seismic source.

In one or more embodiments disclosed herein, the method also includes detecting low-frequency signals responsive to activating the large-volume seismic source.

In one or more embodiments disclosed herein, the low-frequency signals are in the range 2 Hz to 30 Hz.

In one or more embodiments disclosed herein, the method also includes detecting standard-frequency signals responsive to activating the first standard-volume seismic source.

In one or more embodiments disclosed herein, the method also includes generating a velocity model based at least in part on the low-frequency signals; and generating a seismic image based at least in part on the standard-frequency signals.

In one or more embodiments disclosed herein, the method also includes detecting low-frequency signals responsive to activating the large-volume seismic source; detecting standard-frequency signals responsive to activating the first standard-volume seismic source; and deblending the low-frequency signals and the standard-frequency signals.

In an embodiment, a method of manufacturing a geophysical data product includes: obtaining geophysical data for a subterranean formation; and processing the geophysical data to produce an image of the subterranean formation; wherein obtaining the geophysical data includes: towing a standard-volume seismic source with a source vessel; towing, with the source vessel, a large-volume seismic source comprising an airgun having a volume greater than 1200 cubic inches; activating the large-volume seismic source at large shotpoint intervals; and activating the standard-volume seismic source at standard shotpoint intervals, wherein the large shotpoint intervals are at least twice as long as the standard shotpoint intervals.

In one or more embodiments disclosed herein, the method also includes recording the image on one or more non-transitory, tangible computer-readable media, thereby creating the geophysical data product.

In one or more embodiments disclosed herein, the method also includes performing geophysical analysis onshore on the geophysical data product.

In an embodiment, a method includes: obtaining a firing plan for a plurality of seismic sources, wherein: a first seismic source of the plurality comprises a large-volume source element, a second seismic source of the plurality consists of standard-volume source elements, and the firing plan includes: a first shotpoint grid comprising large nominal shotpoint intervals to be used by the first seismic source, and a second shotpoint grid comprising standard nominal shotpoint intervals to be used by the second seismic source; activating the plurality of seismic sources according to the firing plan; and acquiring survey data generated by the activating.

In one or more embodiments disclosed herein, the large-volume source element has a volume that is greater than 1200 cubic inches.

In one or more embodiments disclosed herein, the large-volume source element has a volume that is about 2000 cubic inches.

In one or more embodiments disclosed herein, the large nominal shotpoint intervals are at least twice the standard nominal shotpoint intervals.

In one or more embodiments disclosed herein, the firing plan is selected based on: sampling requirements for the survey data; and fill-time requirements of the large-volume source element.

In one or more embodiments disclosed herein, the survey data comprises low-frequency data.

In one or more embodiments disclosed herein, the fill-time requirements include: a time for the large-volume source element to reach a desired pressure; and an expected vessel speed.

In one or more embodiments disclosed herein, the method also includes manufacturing a geophysical data product by processing the survey data to produce an image of a subterranean formation.

In one or more embodiments disclosed herein, the method also includes recording the image on one or more non-transitory, tangible computer-readable media, thereby creating the geophysical data product.

In one or more embodiments disclosed herein, the method also includes performing geophysical analysis onshore on the geophysical data product.

While the foregoing is directed to embodiments of the present disclosure, other and further embodiments of the disclosure may be devised without departing from the basic scope thereof, and the scope thereof is determined by the claims that follow.

The invention claimed is:

1. A marine survey system comprising:
a first standard-volume seismic source comprising a first standard-volume source element;
a second standard-volume seismic source comprising a second standard- volume source element;
a large-volume seismic source comprising:
   a large-volume source element comprising an airgun having a volume greater than 1200 cubic inches; and
   a third standard-volume source element; and
a long-offset survey streamer.

2. A method of marine surveying comprising:
towing a standard-volume source element with a source vessel;
towing, with the source vessel, a large-volume source element comprising an airgun having a volume greater than 1200 cubic inches;
activating the large-volume source element at large shotpoint intervals, wherein the large shotpoint intervals are at least about 75 m; and
activating the standard-volume source element at standard shotpoint intervals, wherein the large shotpoint intervals are at least twice as long as the standard shotpoint intervals.

3. The method of claim 2, wherein:
the large shotpoint intervals are in the range 30 to 100 seconds, and
the standard shotpoint intervals are in the range 4 to 8 seconds.

4. The method of claim 2, wherein:
the large shotpoint intervals are in the range 75 m to 250 m, and
the standard shotpoint intervals are in the range 10 m to 30 m.

5. The method of claim 2, wherein:
the standard-volume source element is a component of a first standard-volume seismic source,
the large-volume source element is a component of a large-volume seismic source, and
the method further comprises towing a second standard-volume seismic source with the source vessel.

6. The method of claim 5, wherein the first standard-volume seismic source and the second standard-volume seismic source are towed on opposite sides of a survey path midline of the source vessel.

7. The method of claim 6, wherein the large-volume seismic source is towed along the survey path midline.

8. The method of claim 5, wherein the large-volume seismic source comprises a second standard-volume source element.

9. The method of claim 5, further comprising
activating the first standard-volume seismic source and the second standard-volume seismic source in a modified flip-flop pattern, wherein the modified flip-flop pattern comprises:
four alternating activations of the first standard-volume seismic source and the second standard-volume seismic source, the four alternating activations defining a regular series; and
at a point where the regular series would result in a fifth activation of the first standard-volume seismic source or the second standard-volume seismic source, activating the large-volume seismic source instead of the first standard-volume seismic source or the second standard-volume seismic source.

10. The method of claim 5, further comprising detecting low-frequency signals responsive to activating the large-volume seismic source.

11. The method of claim 10, wherein the low-frequency signals are in the range 2 Hz to 30 Hz.

12. The method of claim 10, further comprising detecting standard-frequency signals responsive to activating the first standard-volume seismic source.

13. The method of claim 12, further comprising:
generating a velocity model based at least in part on the low-frequency signals; and
generating a seismic image based at least in part on the standard-frequency signals.

14. The method of claim 5, further comprising:
detecting low-frequency signals responsive to activating the large-volume seismic source;
detecting standard-frequency signals responsive to activating the first standard-volume seismic source; and
deblending the low-frequency signals and the standard-frequency signals.

15. A method comprising:
obtaining a firing plan for a plurality of seismic sources, wherein:
   a first seismic source of the plurality comprises a large-volume source element,
   a second seismic source of the plurality consists of standard-volume source elements, and
   the firing plan comprises:
      a first shotpoint grid comprising large nominal shotpoint intervals to be used by the first seismic source, wherein the large nominal shotpoint intervals are at least about 75 m, and
      a second shotpoint grid comprising standard nominal shotpoint intervals to be used by the second seismic source;
activating the plurality of seismic sources according to the firing plan; and
acquiring survey data generated by the activating.

16. The method of claim 15, wherein the large-volume source element has a volume that is greater than 1200 cubic inches.

17. The method of claim 15, wherein the large nominal shotpoint intervals are at least twice the standard nominal shotpoint intervals.

18. method of claim 15, wherein the firing plan is selected based on:
sampling requirements for the survey data; and fill-time requirements of the large-volume source element.

19. The method of claim 18, wherein:
the survey data comprises low-frequency data, and
the fill-time requirements include:
   a time for the large-volume source element to reach a desired pressure; and
   an expected vessel speed.

20. The method of claim 15, further comprising:
manufacturing a geophysical data product by processing the survey data to produce an image of a subterranean formation;
recording the image on one or more non-transitory, tangible computer-readable media, thereby creating the geophysical data product; and
performing geophysical analysis onshore on the geophysical data product.

\* \* \* \* \*